US012633058B2

(12) United States Patent
Miraldo et al.

(10) Patent No.: US 12,633,058 B2
(45) Date of Patent: May 19, 2026

(54) ORIENTED-GRID ENCODER FOR 3D IMPLICIT REPRESENTATION

(71) Applicant: Mitsubishi Electric Research Laboratories, Inc., Cambridge, MA (US)

(72) Inventors: Pedro Miraldo, Cambridge, MA (US); Goncalo Pais, Lisbon (PT); Arihant Gaur, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 161 days.

(21) Appl. No.: 18/491,934

(22) Filed: Oct. 23, 2023

(65) Prior Publication Data

US 2025/0131651 A1      Apr. 24, 2025

(51) Int. Cl.
*G06T 17/20* (2006.01)
*G06T 3/4007* (2024.01)
*G06T 17/00* (2006.01)

(52) U.S. Cl.
CPC ............ *G06T 17/20* (2013.01); *G06T 3/4007* (2013.01); *G06T 17/005* (2013.01)

(58) Field of Classification Search
CPC ..... G06T 17/20; G06T 3/4007; G06T 17/005; G06T 2210/56; G06T 17/00
See application file for complete search history.

(56) References Cited

U.S. PATENT DOCUMENTS

| | | | | |
|---|---|---|---|---|
| 12,417,584 | B2 * | 9/2025 | Lin ...................... | G06N 3/0475 |
| 2022/0292341 | A1 * | 9/2022 | Mehta ................... | G06T 3/4007 |
| 2023/0005217 | A1 * | 1/2023 | Chen ...................... | G06N 20/00 |
| 2023/0035475 | A1 * | 2/2023 | Cheng .................... | G01S 17/89 |
| 2024/0029357 | A1 * | 1/2024 | Arora ..................... | G06N 3/048 |
| 2024/0331282 | A1 * | 10/2024 | Atherton ............... | G06V 10/44 |

* cited by examiner

*Primary Examiner* — Amr A Awad
(74) *Attorney, Agent, or Firm* — Gene Vinokur

(57) ABSTRACT
An artificial intelligence system for producing an implicit representation of a three-dimensional (3D) scene including a 3D object by training a neural network including an encoder configured for encoding data indicative of a 3D point cloud of a shape of the object into grid-based features capturing multiple resolutions of the object and a decoder, the system comprising: a processor and a memory having instructions stored thereon that cause the processor to: (i) receive input data indicative of an oriented point cloud of a 3D scene including a 3D object, the input data indicating 3D locations of points of the 3D point cloud and orientations of the points defining a normal to a surface of the 3D object at locations proximate to the 3D locations of the points; and (ii) train the encoder and the decoder to produce an implicit representation of the 3D object.

19 Claims, 11 Drawing Sheets

250

310

330

340

From Regular to Oriented Grids

| Network options | | | | | Results | | |
|---|---|---|---|---|---|---|---|
| Trilinear Interpolation | Cylindrical Interpolation | 3DCNN 3x3x3 | 3DCNN 5x5x5 | Normals Regularization | CD↓ | NC↓ | IoU↑ |
| ✓ | | | | | 1.278 | 4.410 | 0.881 |
| | ✓ | | | | 0.570 | 4.348 | 0.990 |
| | ✓ | ✓ | | | 0.434 | 4.094 | 0.998 |
| | ✓ | | ✓ | | 0.431 | 4.093 | 0.998 |
| | ✓ | | ✓ | ✓ | 0.443 | 4.058 | 0.998 |

(a)        (b)        (c)        (d)        (e)              (f)

| Network options | | | | Results | | |
|---|---|---|---|---|---|---|
| Regular Grids | Oriented Grids | SDF Decoder | Occupancy Decoder | CD↓ | NC↓ | IoU↑ |
| ✓ | | ✓ | | 0.445 | 4.257 | 0.997 |
| ✓ | | | ✓ | 0.687 | 4.117 | 0.989 |
| | ✓ | | ✓ | 0.788 | 4.140 | 0.995 |
| | ✓ | ✓ | | 0.443 | 4.058 | 0.998 |

(a) Oriented grids          (b) Regular grids

|  | SIREN | BACON | FF | NDF | Ours |
|---|---|---|---|---|---|
| *Results for the ABC dataset* | | | | | |
| CD↓ | 5.837 | 2.229 | 18.98 | 5.020 | 0.603 |
| NC↓ | 5.150 | 4.658 | 5.170 | 4.732 | 3.987 |
| IoU ↑ | 0.879 | 0.987 | 0.916 | 0.950 | 0.998 |
| *Results for the Thingi10k dataset* | | | | | |
| CD↓ | 62.85 | 60.72 | 67.93 | 4.421 | 0.608 |
| NC↓ | 49.11 | 5.052 | 58.31 | 4.636 | 4.413 |
| IoU ↑ | 0.716 | 0.928 | 0.877 | 0.920 | 0.995 |
| *Results for the ShapeNet dataset* | | | | | |
| CD↓ | — | — | — | 4.125 | 0.392 |
| NC↓ | — | — | — | 6.186 | 5.425 |
| IoU ↑ | — | — | — | 0.984 | 0.999 |
| *Number of Inference Parameters* | | | | | |
| # Params. | 199K | 537K | 527K | 4.62M | 388K |

FIG. 11

ORIENTED-GRID ENCODER FOR 3D IMPLICIT REPRESENTATION

FIELD OF THE DISCLOSURE

The present disclosure is directed generally to methods and systems for producing an implicit representation of a three-dimensional scene.

BACKGROUND

There are many different ways of representing three-dimensional (3D) surfaces. In implicit surface representations, a point with coordinates x, y, and z belongs to an object if $F(x,y,z)=0$, where function $F (\bullet)$ defines the object. This type of 3D representation is advantageous since it is concise and guarantees continuity. Most learning-based 3D implicit representations start with encoding 3D points, then decoding their features into the chosen representation, defining $F(\bullet)$.

Two kinds of encoders are used, usually in parallel: (1) mapping the 3D coordinates of each point alone to a higher dimensional vector space, here denoted as positional encoder; and (2) 3D points gathering information about their neighbors, termed grid-based. A multilayer perceptron (MLP) is usually considered a suitable choice for decoders. Previous techniques using geometric encoders do not consider some of the object's underlying geometric characteristics and only utilize its spatial localization, thus forming unsatisfactory 3D representations.

SUMMARY OF THE DISCLOSURE

There is thus a continued unmet need for methods and systems that consider all of an object's underlying geometric characteristics when generating implicit surface representations. Various embodiments and implementations are directed to a method and system for producing an implicit representation of a 3D scene including a 3D object by training a neural network including an encoder configured for encoding data indicative of a 3D point cloud of a shape of the 3D object into grid-based features capturing multiple resolutions of the object and a decoder configured for decoding the grid-based features into a distance to the object from an arbitrary point in the 3D scene.

According to an aspect, an artificial intelligence (AI) system is provided. The AI system produces an implicit representation of a three-dimensional (3D) scene including a 3D object by training a neural network including an encoder configured for encoding data indicative of a 3D point cloud of a shape of the object into grid-based features capturing multiple resolutions of the object and a decoder configured for decoding the grid-based features into a distance to the object from an arbitrary point in the 3D scene, the AI system comprising: at least one processor and a memory having instructions stored thereon that cause the at least one processor of the AI system to: (i) receive input data indicative of an oriented point cloud of a 3D scene including a 3D object, the input data indicating 3D locations of points of the 3D point cloud and orientations of the points defining a normal to a surface of the 3D object at locations proximate to the 3D locations of the points; (ii) train the encoder and the decoder using both the locations of the points and the orientations of the points to produce an implicit representation of the 3D object; and (iii) transmit the implicit representation of the 3D object including the encoder and the decoder via a wired or wireless communication channel.

This input data, indicative of an oriented point cloud of a 3D scene including a 3D object, can be obtained in several ways. According to an embodiment, it is acquired from an RGB-D sensor that outputs a point cloud. The 3D point orientation can be obtained in several ways, for instance, by locally approximating the neighboring points by a planar surface or using neural networks. The same kind of 3D point clouds can be obtained from other types of sensors, such as stereo cameras or even monocular cameras with neural networks that predict the depth per pixel, among other possibilities.

Another way to obtain the input data is related to augmented/virtual reality. According to this embodiment, there is a triangulated mesh defining the object, and the 3D point cloud can be obtained directly from the triangulated mesh corners. The respective 3D point orientation is given by the average of the respective 3D point neighbor triangles' normals.

According to an embodiment, the encoder is trained to transform one or a combination of the locations of points of the 3D point cloud and the orientations of the points into the grid-based features capturing multiple resolutions of the object, and the decoder is trained on interpolations of the grid-based features to reduce a loss function of an error between a distance to the object from a point in the 3D scene produced by the decoder and a ground truth distance.

According to an embodiment, the encoder is trained to transform the locations of points of the 3D point cloud into the grid-based features, and the decoder is trained on the interpolations within a set of nested shapes enclosing the grid-based features and oriented based on the orientations of the points in proximity of a corresponding nested shape.

According to an embodiment, the encoder is trained to encode the locations of the points as the grid-based features capturing multiple resolutions of the object, and the decoder is trained based on oriented features represented by interpolations within a set of nested shapes enclosing the grid-based features and oriented based on the orientation of the points in proximity of a corresponding nested shape.

According to an embodiment, wherein to train the encoder and the decoder, the processor is configured to: encode, using the encoder, the input data into an octree representation of features capturing multiple resolutions of a shape of the 3D object; enclose each feature of the octree representation with oriented shapes having rotational symmetry around their axes, wherein dimensions of an oriented shape enclosing a feature are governed by a level of the enclosed feature on the octree representation, and wherein an orientation of an axis of the oriented shape is governed by the normals to the surface of a subset of points neighboring coordinates of the enclosed feature; interpolate features within each oriented shape using a volumetric interpolation to update the features of the octree representation; decode, using the decoder, the updated octree representation of the features to produce the distance function; and update parameters of the neural network to minimize a loss function of an error between a distance to the object from a point in the 3D scene produced by the decoder and a ground truth distance.

According to an embodiment, the oriented shapes having rotational symmetry include one or more of a cylinder and a sphere.

According to an embodiment, each of the oriented shapes having rotational symmetry is a cylinder enclosing one or multiple grid-based features and oriented such that the axis of each of the cylinders is aligned to a normal to a region of a surface governed by dimensions of the cylinder and locations of the enclosed features.

According to an embodiment, each of the oriented shapes having rotational symmetry is a cylinder enclosing one or multiple grid-based features, and the processor is configured to orient the cylinder to align the axis of the cylinder to a normal to a region of a surface governed by dimensions of the cylinder and locations of the enclosed features.

According to an embodiment, the interpolation is a volumetric interpolation, and the processor is configured to determine cylindrical interpolation coefficients measuring closeness of a point to extremities of the cylindrical representation. According to an embodiment, the cylindrical interpolation coefficients comprise: (i) a first coefficient computed from a distance of the point to a top plane of the cylinder and a difference in volume of the cylinder and the point's distance to an axis of symmetry of the cylinder; (ii) a second coefficient computed from a distance of the point to a bottom plane of the cylinder and the difference in volume of the cylinder and the point's distance to the axis of symmetry of the cylinder; and (iii) a third coefficient computed from a remainder of the cylinder.

According to an embodiment, wherein during training of the encoder of the neural network, the processor is configured to determine the cylindrical interpolation coefficients for a plurality of sampled points of an input point cloud.

According to an embodiment, the processor is configured to render an image of the 3D object on a display device using the implicit representation of the 3D object.

According to another aspect is an image processing system operatively connected to the AI system via the wired or wireless communication channel, wherein the image processing system is configured to render an image of the 3D object on a display device using the implicit representation of the 3D object.

According to an embodiment, the image of the 3D object is rendered for varying viewing angles.

According to an embodiment, the image of the 3D object is rendered for varying viewing angles within a virtual reality or gaming application.

According to another aspect is a robotic system operatively connected to the AI system via the wired or wireless communication channel, wherein the robotic system is configured to perform a task using the implicit representation of the 3D object.

According to another aspect is a display device operatively connected to the AI system via the wired or wireless communication channel, wherein the processor is configured to render an image of the 3D object using the implicit representation of the 3D object, and wherein the display device is configured to display the rendered image of the 3D object.

According to another aspect is an image processing system configured to render an image of a three-dimensional (3D) object on a display using an implicit representation of the 3D object, wherein the image processing system comprises: a trained neural network including an encoder configured for encoding data indicative of a 3D point cloud of a shape of the 3D object into grid-based features capturing multiple resolutions of the object and a decoder configured for decoding the grid-based features into a distance to the object from an arbitrary point in a 3D scene including the 3D object; at least one processor and a memory having instructions stored thereon that cause the at least one processor to: receive input data indicative of an oriented point cloud of a 3D scene including a 3D object, the input data indicating 3D locations of points of the 3D point cloud and orientations of the points defining a normal to a surface of the 3D object at locations proximate to the 3D locations of the points;

produce, with the encoder using both the locations of the points and the orientations of the points, an implicit representation of the 3D object; render, with the encoder an image of the 3D object using the implicit representation of the 3D object; and display the rendered image on a display.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. The figures showing features and ways of implementing various embodiments and are not to be construed as being limiting to other possible embodiments falling within the scope of the attached claims. Also, the drawings are not necessarily to scale, emphasis instead generally being placed upon illustrating the principles of the various embodiments.

FIG. 11 is a table detailing experimental results of the method against other types of representations, in accordance with an embodiment.

DETAILED DESCRIPTION OF EMBODIMENTS

The present disclosure describes various embodiments of a system and method configured to produce an implicit representation of a three-dimensional (3D) scene. More generally, Applicant has recognized and appreciated that it would be beneficial to provide a method and system that considers all of an object's underlying geometric characteristics when generating implicit surface representations. Accordingly, an implicit representation generation system produces an implicit representation of a 3D scene including a 3D object by training a neural network. The neural network includes an encoder configured for encoding data indicative of a 3D point cloud of a shape of the 3D object into grid-based features capturing multiple resolutions of the object. The neural network also includes a decoder configured for decoding the grid-based features into a distance to the object from an arbitrary point in the 3D scene.

In the 3D implicit representation pipeline, a single 3D point passes through a geometric encoder, positional encoder, or both. The features are then injected into a decoder that models the object's surface. Repeating the process for all point cloud points obtains a sparse output representation with respect to the modeled 3D surface.

Figure 1:
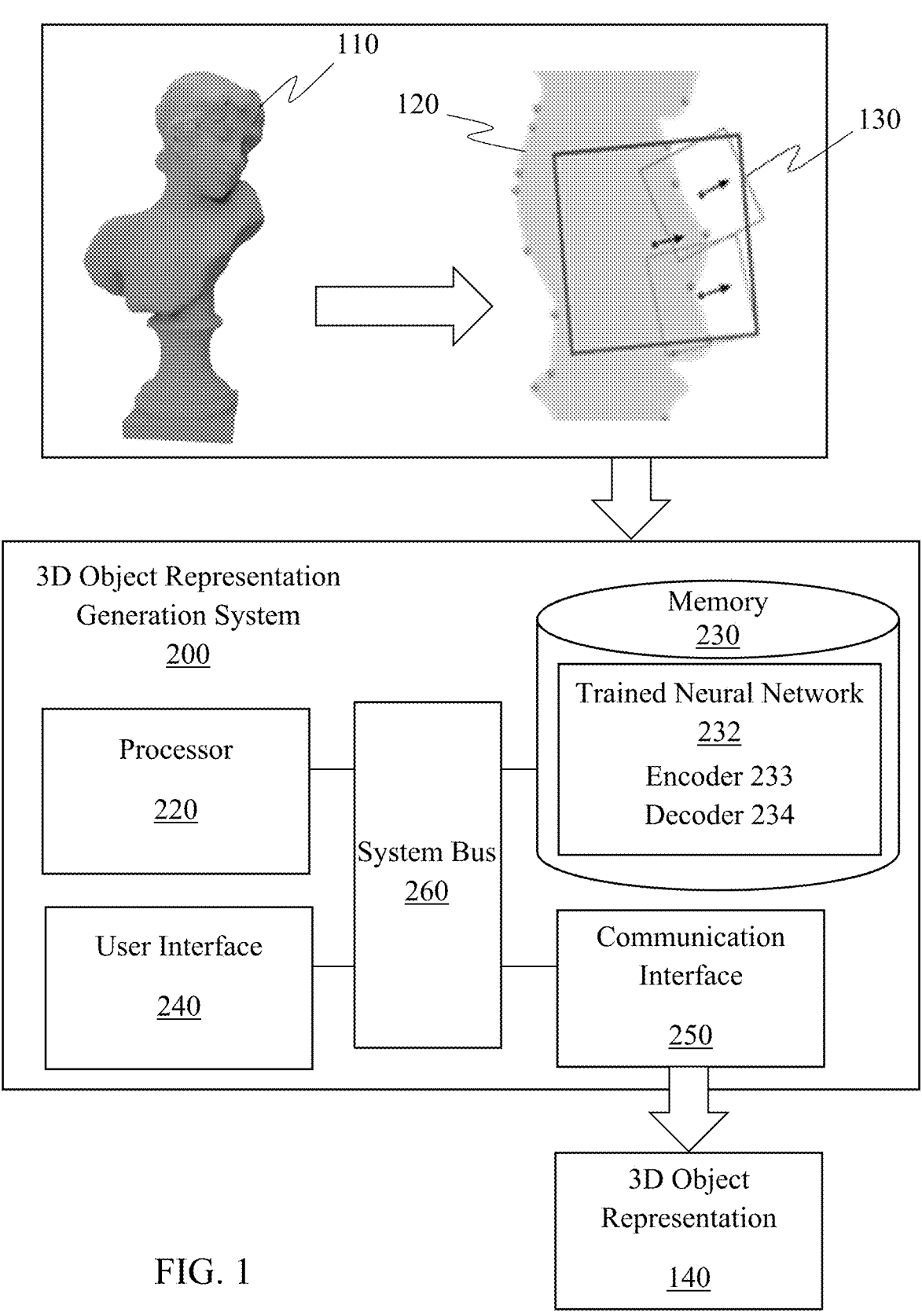
FIG. 1 is a schematic representation of a 3D object representation generation method and system, in accordance with an embodiment.

Referring to FIG. 1, in one embodiment, is a schematic representation of a 3D object representation generation method and system. The methods described in connection with the figures are provided as examples only, and shall be understood not to limit the scope of the disclosure. The implicit representation generation system 200 can be any of the systems described or otherwise envisioned herein. The implicit representation generation system can be a single system or multiple different systems.

The 3D object representation generation system 200 is an artificial intelligence (AI) system for producing an implicit representation of a three-dimensional (3D) scene including a 3D object. System 200 trains a neural network 232 including: (1) an encoder 233 configured for encoding data indicative of a 3D point cloud 120 of a shape of the object 110 into grid-based features capturing multiple resolutions of the object; and (2) a decoder 234 configured for decoding the grid-based features into a distance to the object from an arbitrary point in the 3D scene.

System 200 receives input data indicative of an oriented point cloud 120 of a 3D scene including a 3D object 110, the input data indicating 3D locations of points of the 3D point cloud and orientations 130 of the points defining a normal to a surface of the 3D object at locations proximate to the 3D locations of the points. System 200 trains the encoder 233 and the decoder 234 using both the locations of the points and the orientations of the points to produce an implicit representation of the 3D object. The system can then transmit, such as via the communication interface 250, the implicit representation 140 of the 3D object (optionally including the encoder and the decoder) via a wired or wireless communication channel.

According to an embodiment, an implicit representation generation system 200 is provided. Referring to an embodiment of an implicit representation generation system 200 as depicted in FIG. 1, for example, the system comprises one or more of a processor 220, memory 230, user interface 240, and communications interface 250, interconnected via one or more system buses 260. It will be understood that FIG. 1 constitutes, in some respects, an abstraction and that the actual organization of the components of the system 200 may be different and more complex than illustrated. Additionally, implicit representation generation system 200 can be any of the systems described or otherwise envisioned herein. Other elements and components of the implicit representation generation system 200 are disclosed and/or envisioned elsewhere herein.

According to an embodiment, system 200 comprises a processor 220 capable of executing instructions stored in memory 230 or otherwise processing data to, for example, perform one or more steps of the method. Processor 220 may be formed of one or multiple modules. Processor 220 may take any suitable form, including but not limited to a microprocessor, microcontroller, multiple microcontrollers, circuitry, field programmable gate array (FPGA), application-specific integrated circuit (ASIC), a single processor, or plural processors.

Memory 230 can take any suitable form, including a non-volatile memory and/or RAM. The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices. The memory can store, among other things, an operating system. The RAM is used by the processor for the temporary storage of data. According to an embodiment, an operating system may contain code which, when executed by the processor, controls operation of one or more components of system 200. It will be apparent that, in embodiments where the processor implements one or more of the functions described herein in hardware, the software described as corresponding to such functionality in other embodiments may be omitted. Memory 230 may be considered to be non-transitory machine-readable media. As used herein, the term non-transitory will be understood to exclude transitory signals but to include all forms of storage, including both volatile and non-volatile memories. According to an embodiment, memory 230 of system 200 may store one or more algorithms, modules, and/or instructions to carry out one or more functions or steps of the methods described or otherwise envisioned herein.

User interface 240 may include one or more devices for enabling communication with a user. The user interface can be any device or system that allows information to be conveyed and/or received, and may include a display, a mouse, and/or a keyboard for receiving user commands. In some embodiments, user interface 240 may include a command line interface or graphical user interface that may be presented to a remote terminal via communication interface 250. The user interface may be located with one or more other components of the system, or may located remote from the system and in communication via a wired and/or wireless communications network.

Communication interface 250 may include one or more devices for enabling communication with other hardware devices. For example, communication interface 250 may include a network interface card (NIC) configured to communicate according to the Ethernet protocol. Additionally, communication interface 250 may implement a TCP/IP stack for communication according to the TCP/IP protocols. Various alternative or additional hardware or configurations for communication interface 250 will be apparent.

While system 200 is shown as including one of each described component, the various components may be duplicated in various embodiments. For example, processor 220 may include multiple microprocessors that are configured to independently execute the methods described herein or are configured to perform steps or subroutines of the methods described herein such that the multiple processors cooperate to achieve the functionality described herein. Further, where one or more components of system 200 is implemented in a cloud computing system, the various hardware components may belong to separate physical systems. For example, processor 220 may include a first processor in a first server and a second processor in a second server. Many other variations and configurations are possible.

Figure 2A:
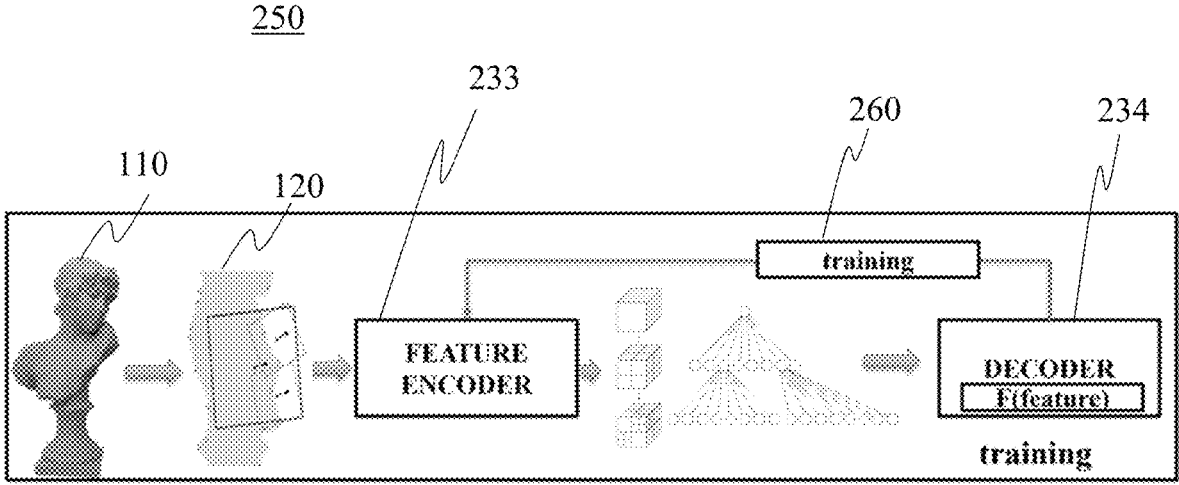
FIG. 2A is a flowchart of a method for training a 3D object representation generation system, in accordance with an embodiment.

Referring to FIG. 2A, in one embodiment, is a flowchart of a method 250 for training a 3D object representation generation system 200 to produce an implicit representation of a 3D scene including a 3D object 110. During training 260, as described herein, the system trains a neural network including an encoder 233 and a decoder 234 to encode, using an octree representation, data indicative of a 3D point cloud of a shape of the object into grid-based features capturing multiple resolutions of the object, and to decode the grid-based features into a distance to the object from an arbitrary point in the 3D scene, thereby modeling the object's surface.

Figure 2B:
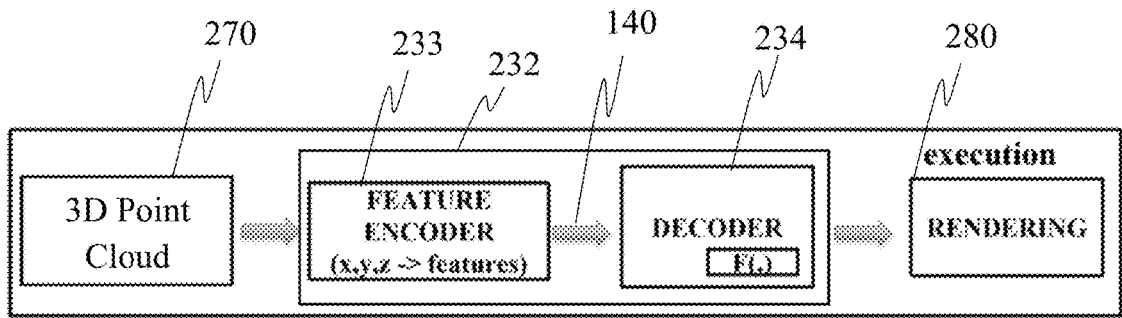
FIG. 2B is a flowchart of a method for producing an implicit representation of a three-dimensional scene, and decoding the representation, in accordance with an embodiment.

FIG. 2B is a flowchart of a method for producing an implicit representation of a three-dimensional scene, and decoding the representation, in accordance with an embodiment. A neural network 232 of the system includes an encoder 233 which is trained to encode data indicative of a 3D point cloud of a shape of the object 270 into grid-based features capturing multiple resolutions of the object. The neural network also includes a decoder 234 which is trained to decode the grid-based features into a distance to the object from an arbitrary point in the 3D scene, thereby modeling the object's surface via an implicit representation 140 of the 3D object. This implicit representation of the 3D object can be used immediately, it can be communicated, and/or it can be stored for future use. During execution 280, the trained neural network is used to decode the encoded implicit representation 140 of the 3D object using trained decoder 234.

Figure 3A:
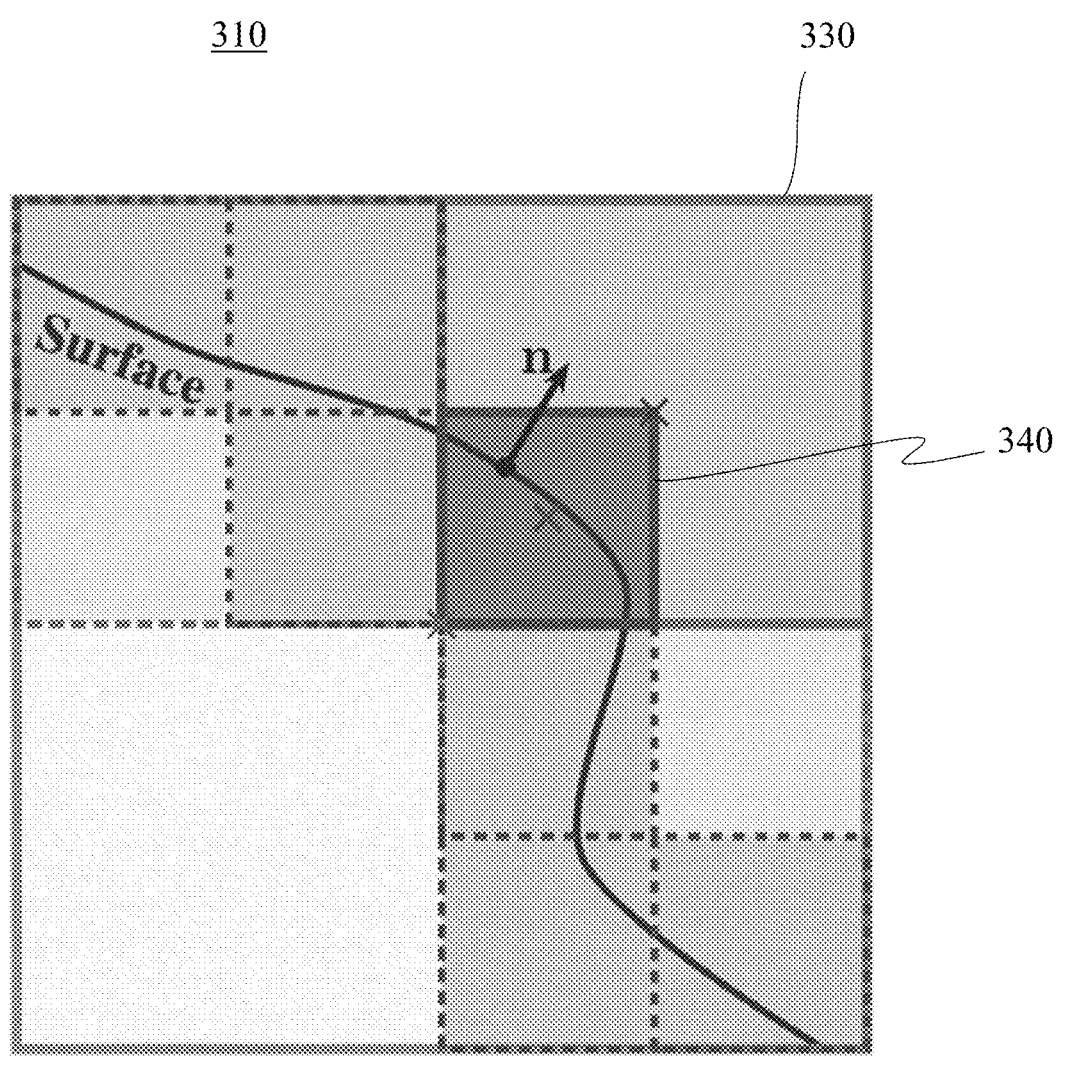
FIG. 3A is a schematic representation of a process for determining orientation when generating a 3D object representation, in accordance with an embodiment.
Figure 3B:
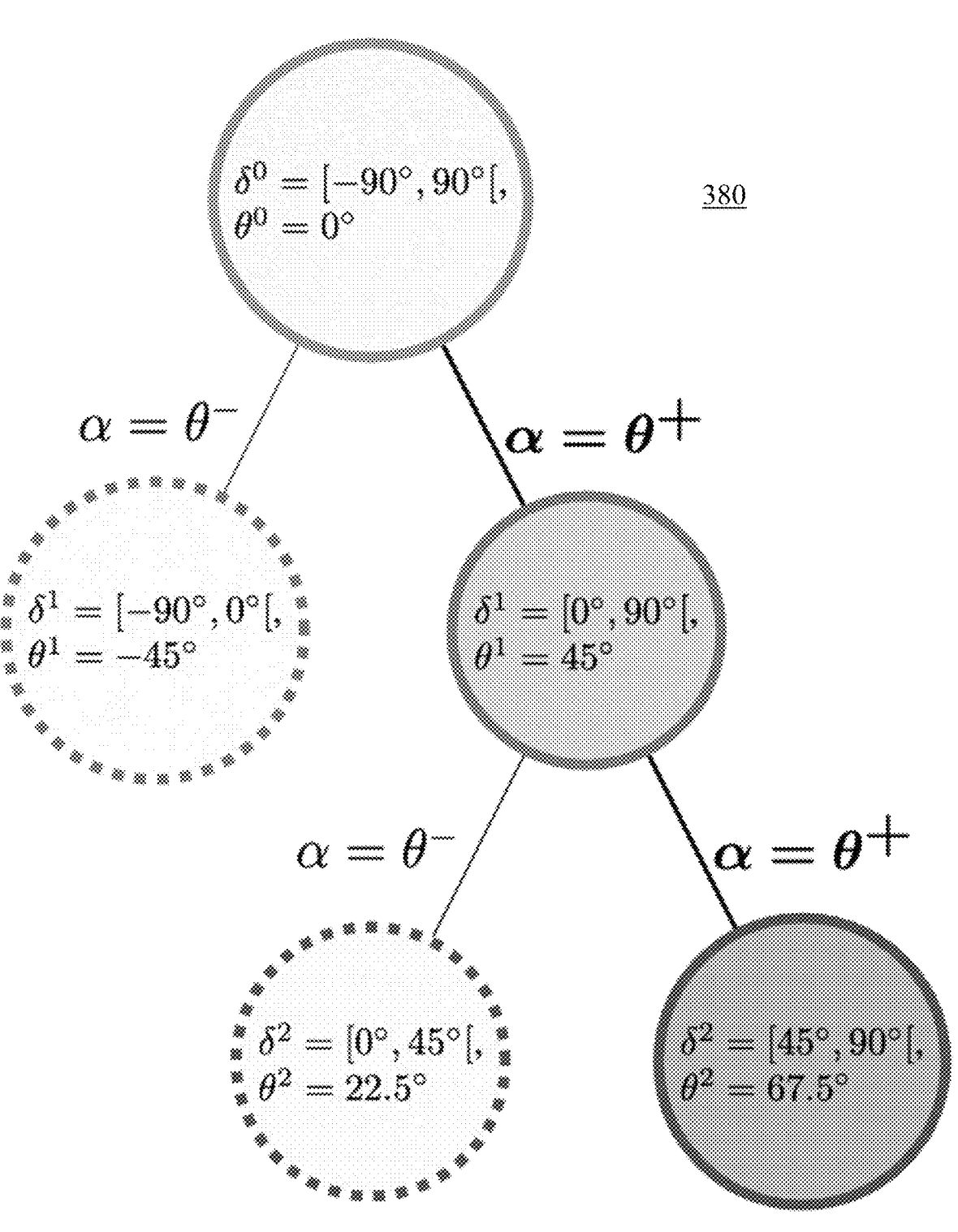
FIG. 3B is a schematic representation of a process for determining orientation when generating a 3D object representation, in accordance with an embodiment.
Figure 3C:
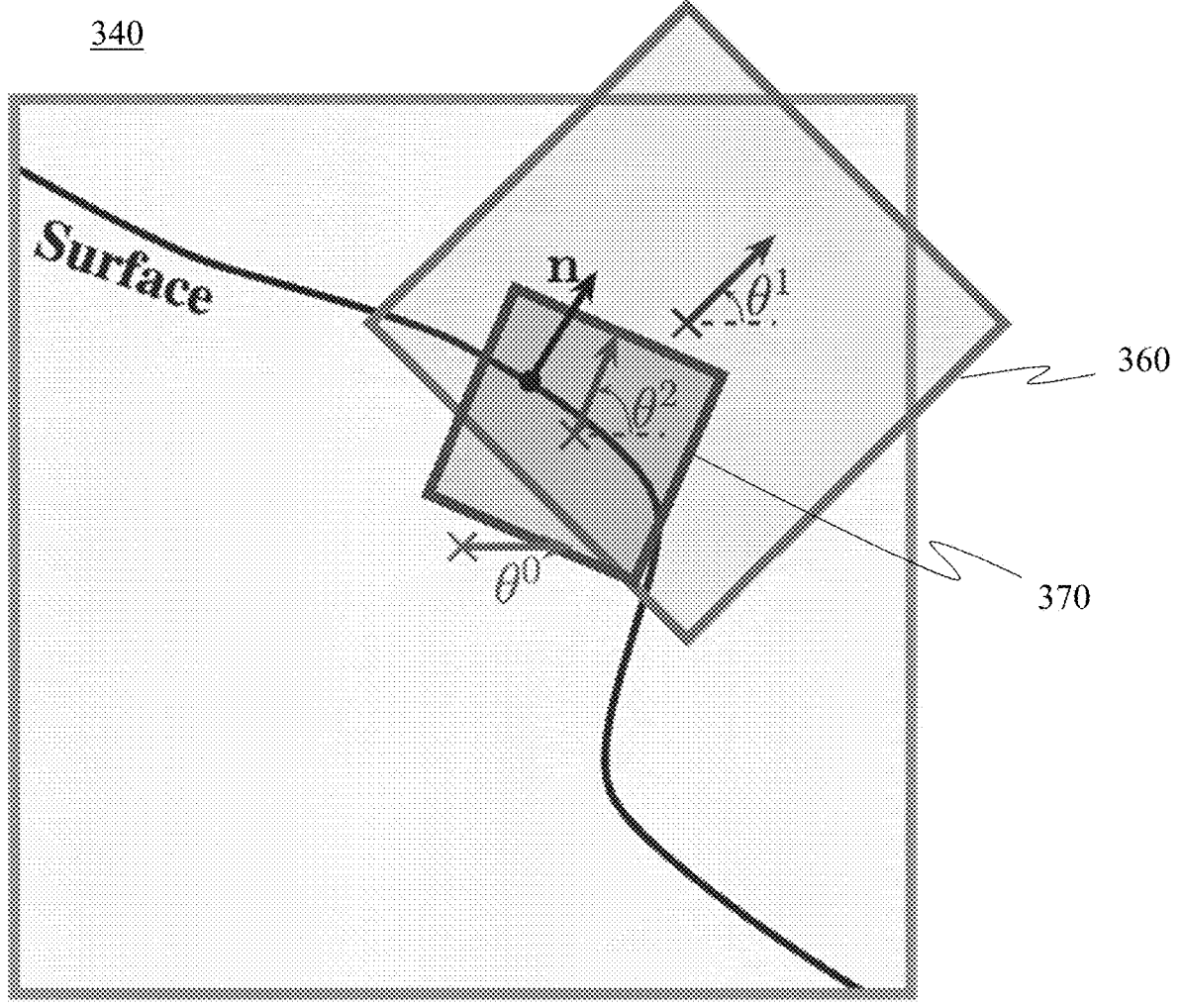
FIG. 3C is a schematic representation of a process for determining orientation when generating a 3D object representation, in accordance with an embodiment.

Referring to FIGS. 3A-3C, in one embodiment, are schematic representations of a process for determining orientation when generating a 3D object representation, in accordance with an embodiment. To generate training data, and to encode a 3D object using a trained encoder, the system generates input data indicative of an oriented point cloud of a 3D scene including a 3D object. That input data indicates the 3D locations of points of the 3D point cloud and orientations of the points defining a normal to a surface of the 3D object at locations proximate to the 3D locations of the points.

For example, referring to FIG. 3A, geometric encoders perform better when different levels of detail are explicitly modeled. The 3D data points are arranged in different spatial resolutions, as shown in grid cells in 310. For each resolution, there are different cells with different sizes. These different grid resolutions are used to aggregate all data point lying inside the respective cell. Numerals 330 and 340 show two different resolutions.

According to an embodiment, the system utilizes five different grid resolutions, creating the multi-resolution grid encoder. However, the number of different grid resolutions can be larger or smaller than five. For example, the number of different grid resolutions may depend on the roughness of the object/surface, and can thus be adjusted accordingly. According to an embodiment, a single decoder can be used for different multi-resolution grid encoders.

Referring to FIGS. 3B and 3C, tree 380 illustrates how the orientation is calculated for a toy example of a single rotation case. In practice, there are three rotations, increasing the tree branching factor to six. As one goes deeper into the depth of the tree, the orientation will be closer to the correct surface orientation, which are illustrated as different gray scales in 380 (FIG. 3B) and 340 (FIG. 3C). Each level of depth in the tree sets the orientation for a single resolution grid.

Referring to FIGS. 3A-3C, for example, cells 340 and 330 are rotated according to the orientation calculated in 380 (i.e., the respective gray scale/depth in the tree), obtaining the rotated cells 360 and 370 (FIG. 3C) respectively. This procedure is repeated for every cell, including different resolutions.

According to an embodiment, in order to generate the input 3D data for training, 3D location of points are obtained aleatorily over the scene, first by sampling closer to the object surface and then adding more dispersed around the environment.

Figure 4A:
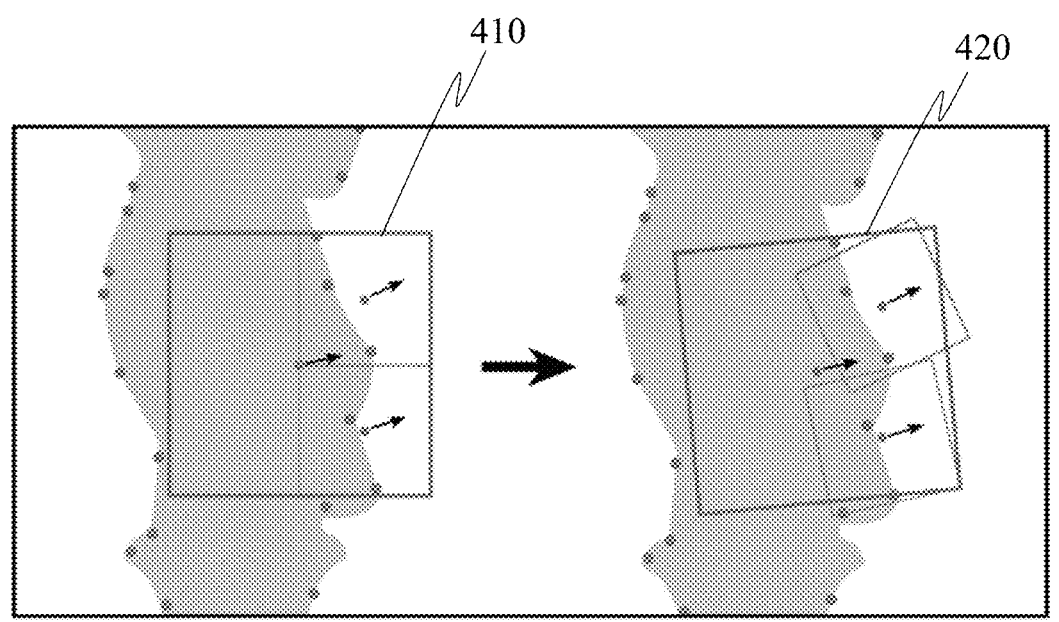
FIG. 4A is schematic representation of a multi-resolution oriented grid that extends an octree representation using regular grids with the object's normal directions, in accordance with an embodiment.

Referring to FIG. 4A is a schematic representation of a process for generating a multi-resolution oriented grid that extends an octree representation using regular grids with the object's normal directions. Cells 410 are rotated to an orientation tree and the respective Levels-of-Depth (LOD) level, forming oriented grids 420.

Figure 4B:
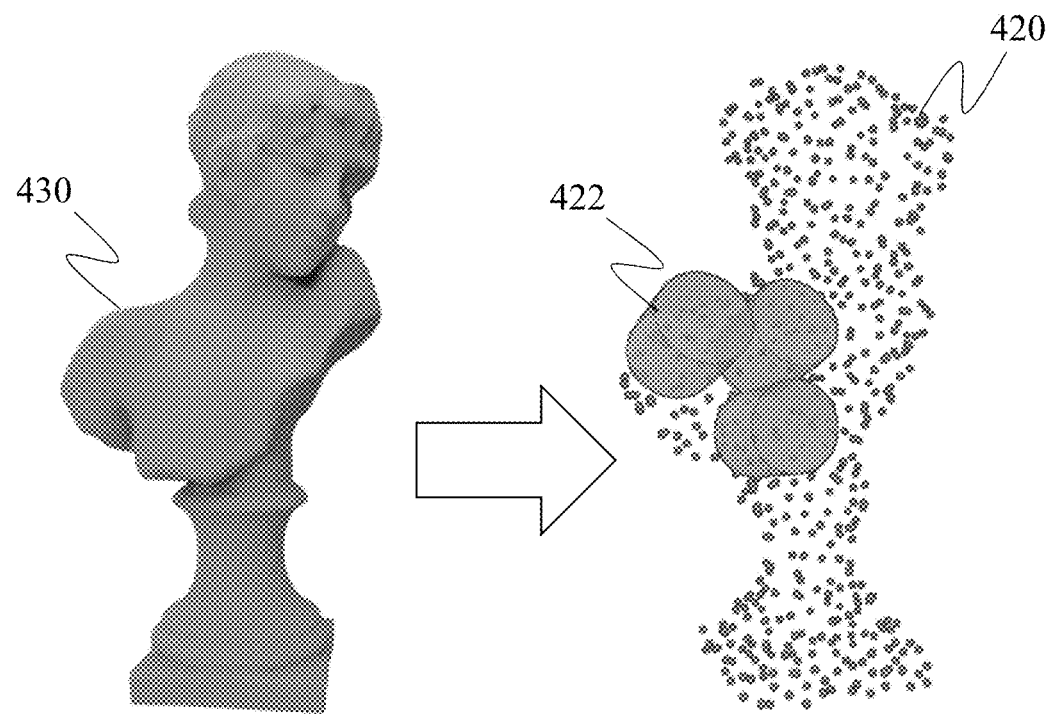
FIG. 4B is a schematic representation of generating an oriented point cloud of a 3D object including orientations of the points, in accordance with an embodiment.

Referring to FIG. 4B is a schematic representation of encoding an object 430. During training, for example, the feature of a sampled point (within a point cloud 420) within the rotated cell is interpolated according to a cylindrical interpolation scheme, shown at 422, in which neighboring cell features are aggregated with a 3DCNN sparse kernel. These features can be used in the current state-of-the-art decoders for object representation, such as signed distance functions (SDFs) and Occupancy. Although a cylindrical interpolation scheme is described with regard to FIG. 4B, it is important to note that any shape with rotational symmetry around its axis is suitable. For example, it could be a sphere or other volumetric shape with rotational symmetry around its axis.

Figure 5:
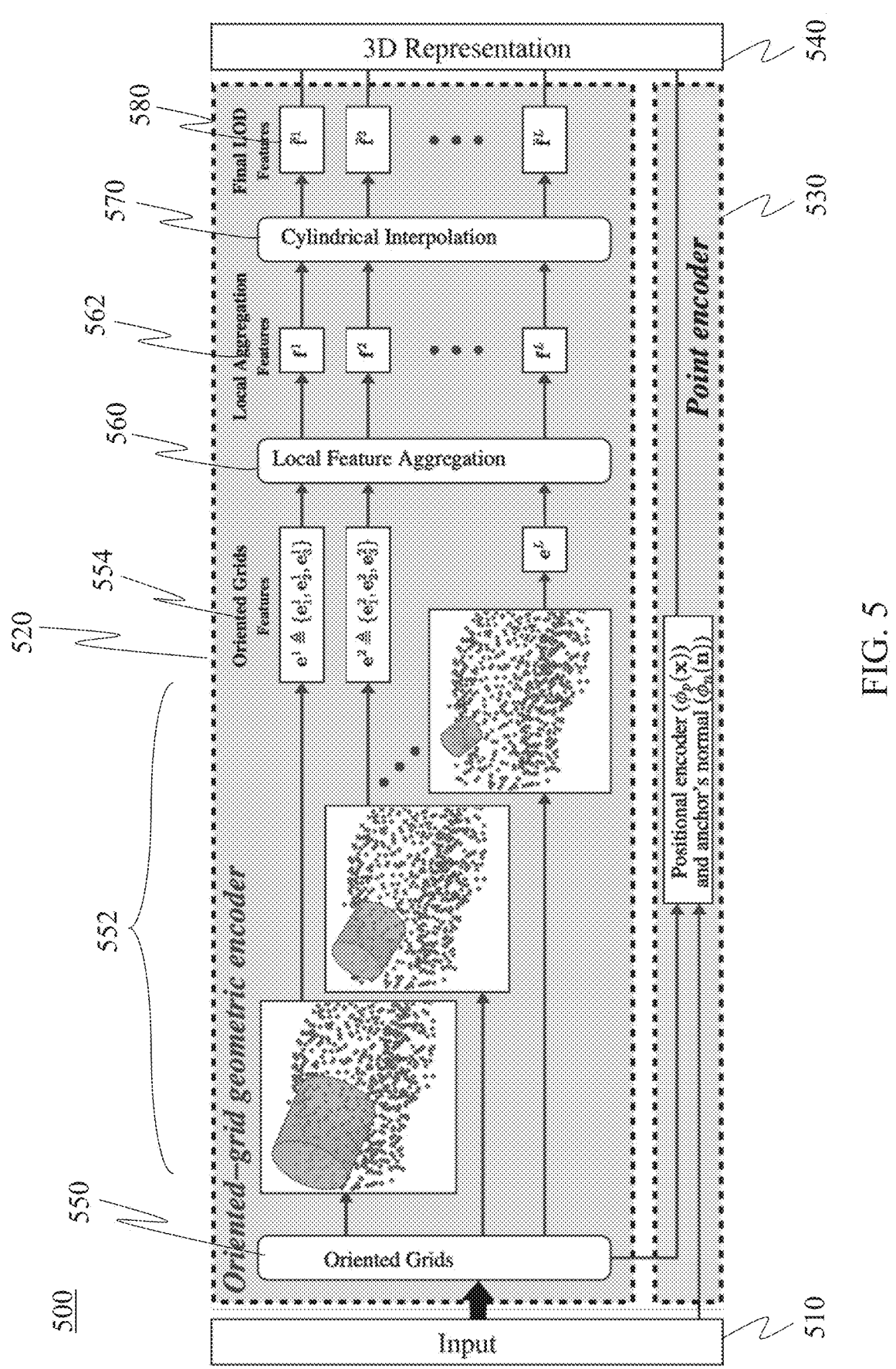
FIG. 5 is a flowchart of a method for producing an implicit representation of a three-dimensional scene, in accordance with an embodiment.

Referring to FIG. 5, in one embodiment, is a method 500 for encoding an object using an encoder of a trained neural network. The encoder includes an oriented-grid geometric encoder 520 to encode the orientation of points in the point cloud received as input 510, and a point encoder 530 to encode the point cloud data received as input 510. Each 3D point passes through the geometric encoder 520, the positional encoder 530, or both. According to an embodiment, the input 510 is a point and the pre-initialized trees that best fit the object. The output 540 is a set of Levels-of-Depth (LOD) tree features forming the 3D representation.

The point encoder 530 includes both a positional encoder, and the anchor's normal. The oriented-grid geometric encoder 520 begins with oriented grids construction at 550, which is a pre-computed step. This includes multiple resolutions of the oriented grids. For example, FIG. 5 depicts three resolutions 552, although fewer and more are also possible. For each resolution, features of the oriented grids (extracted from the trees) 554 are generated. These features are aggregated locally, crossing neighboring information (i.e., local feature aggregation 560). The aggregated features 562 are used in the cylindrical interpolation scheme 570 described or otherwise envisioned herein to generate the final LOD features 580. The LOD tree features 580 and the encoded points from the point encoder 530 results in the 3D representation 540. Although the method in FIG. 5 utilizes a cylindrical interpolation scheme 570, it is noted that any shape with rotational symmetry around its axis is suitable. For example, it could be a sphere or other volumetric shape with rotational symmetry around its axis.

According to an embodiment, oriented grids are constructed. An octree representation is used to model the 3D representation. Specifically, the system uses the octree representation to model the grid-based 3D encoder. However, in addition to the standard eight actions for splitting a grid into eight smaller ones in the subsequent levels of depth, the system includes rotation actions for modeling cell orientations, where at the higher levels a smaller (tighter) grid and a finer alignment better represent the object. Instead of modeling each action individually, which would result in a branching factor of 56 per subsequent LOD (8 for grid position, times 7 for orientation), and since grid size and orientation are independent, they are split into two trees: (i) Tree 1: Structured octree for modeling the sizes of the grids; and (ii) Tree 2: Orientation tree for modeling the cell orientation.

For the structured octree in Tree 1, its representation consists of positional LODs (without orientations), bounded within [−1, 1]. A typical octree modeling was followed from existing works.

For the orientation Tree 2, for a normalized point x taken from the object's surface point cloud, w a normal is associated to this query, denoted as n. The goal is to align the cells along the surface. To maintain consistency within the LODs, a set of normal anchors was constructed representing the finite possible set of orientations per level. The cells were then rotated such that the z-axis matches the anchor, which is the closest anchor to the query normal n. To model this searching tree, one needs to define: i) the node state, ii) the actions, iii) state transition, and iv) initial state.

According to an embodiment, the node state denoted as $\delta$ is defined by a set of three 2-tuple elements:

$$\delta = (r_{x^-}, r_{x^+}), (r_{y^-}, r_{y^+}), (r_{z^-}, r_{z^+}) \qquad \text{(Eq. 1)}$$

There are seven possible actions:

$$\mathcal{A} = \{0, x_-, x_+, y_-, y_+, z_-, z_+\} \qquad \text{(Eq. 2)}$$

A state at LOD l+1 is obtained from a state at LOD l after applying an action $a \in \mathcal{A}$ using a state transition:

$$\delta_\alpha^{l+1} = \mathcal{T}(\delta^l, \alpha): \qquad \text{(Eq. 3)}$$

$$T(\delta^l, x_-) = \left(r_{x^-}^l, \frac{r_{x^-}^l + r_{x^+}^l}{2}\right), (r_{y^-}^l, r_{y^+}^l), (r_{z^-}^l, r_{z^+}^l) \qquad \text{(Eq. 4)}$$

$$T(\delta^l, x_-) = \left(\frac{r_{x^-}^l + r_{x^+}^l}{2}, r_{x^+}^l\right), (r_{y^-}^l, r_{y^+}^l), (r_{z^-}^l, r_{z^+}^l) \qquad \text{(Eq. 5)}$$

for actions $x_-$ and $x_+$. Action 0 means no rotation, i.e., $$\delta_\alpha^{l+1} = \delta^l.$$

The remaining actions can be derived from the above equation. The initial state is set as $(−\pi, \pi), (−\pi, \pi), (−\pi, \pi)$.

Orientation tree modeling is concluded by defining rotations. A rotation is obtained per LOD and cell from state $\delta$. The rotation anchor is defined from the states' Euler angles range $(r_x, r_y, r_z)$, where:

$$r_i = (r_{i^+} + r_{i^-})/2, \forall i \in \{x, y, z\} \qquad \text{(Eq. 6)}$$

To compute the state $\delta$ for each cell, the rotation anchors are allowed to align the z-axis of the cell with the surface normal, using cosine similarity, up to a rotation degree of freedom.

Concerning the grid to query point association, each cell in Tree 1 has a fixed orientation computed from searching Tree 2. During training and evaluation, a query point is associated with a cell in Tree 1 (structured tree) on a particular LOD. Then, the cell is rotated using the corresponding rotation anchor. Note that a point may be outside all octree cells; in this case, the query is discarded.

While trilinear interpolation has been the typical way of obtaining the features for regular (non-oriented) grids, as shown in FIG. 3A, for oriented grids, using the same approach as regular grids cannot be applied. So, the system uses oriented cylinders, as shown in FIG. 4B (which is the 3D representation of the oriented grid in FIG. 3C), which can exploit the alignment of the cells and mitigate the lack of invariance in defining the grid orientation (invariance rotation around the normal direction), as discussed herein. This rotation invariance adds an explicit smoothness constraint to points inside the grid.

Figure 6:
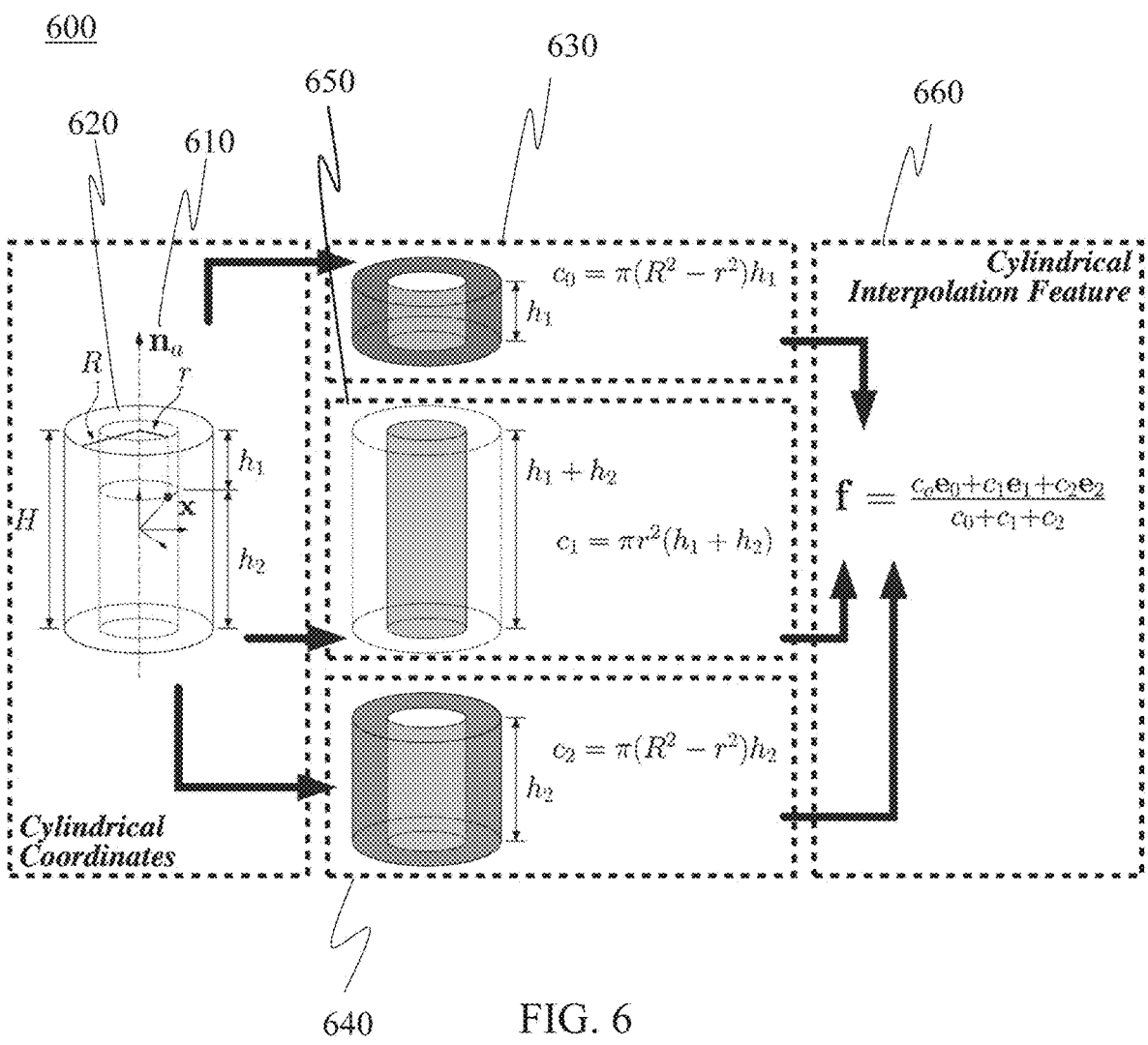
FIG. 6 is a proposed scheme for cylindrical interpolation, in accordance with an embodiment.

Referring to FIG. 6, therefore, is a proposed scheme for cylindrical interpolation, in accordance with an embodiment. Although the method in FIG. 6 utilizes a cylindrical interpolation scheme, it is noted that any shape with rotational symmetry around its axis is suitable. For example, it could be a sphere or other volumetric shape with rotational symmetry around its axis.

The input cell grid has a corresponding anchor normal n 610 obtained from the oriented grids (per LOD). The cylinder 620 is aligned with the grid normal anchor 610, with a radius R and height H. The interpolation scheme is of volumetric interpolation type. It depends on the distance of the query point x to the cylinder's height boundaries $h_1$ and $h_2$, and the distance between x and the cylindrical axis of symmetry, denoted as r.

At 630, the first coefficient $c_0$ is computed from the distance of the point to the top plane $h_1$ and the difference in volumes considering R and the point's distance to the axis of symmetry r. At 640, the coefficient $c_2$ is computed from the distance to the bottom plane $h_2$ and the difference in volumes considering R and the point's distance to the axis of symmetry r. Finally, at 650, $c_1$ is the remainder cylinder. Each coefficient has an associate learnable feature $e_k$ for k={0, 1, 2}. The interpolated feature f is the weighted average of $e_k$ with $c_k$ weights. At 660, a cylindrical interpolation feature is generated from $c_0$, $c_1$, and $c_2$.

Given the query point, the objective is to compute relative spatial volumes for feature coefficients, considering the point's relative position within the cylinder. Cylindrical interpolation coefficients measure the closeness of the point to the extremities of the cylinder cell representation, as depicted in FIG. 6. A point closer to the top and the border of the cylinder will produce a lower volume for that boundary (volume in 630 in FIG. 6). Therefore, its distance from the opposite face will be high, thus, a higher volume coefficient (volume in 640 in FIG. 6). The highest coefficient in this example will be the opposite according to the center axis (volume in 650 in FIG. 6).

Finally, the volumetric interpolation gives three coefficients, $c_0$, $c_1$, and $c_2$ (derivations in FIG. 6). With these coefficients, learnable features $$e^l = \{e_0^l, e_1^l, e_2^l\},$$

per cell (for simplicity, the the cell index is omitted) and per LOD l, are used to interpolate the query point features (linear combination):

$$f^l = (c_0 e_0^l + c_1 e_1^l + c_2 e_2^l)/(c_0 + c_1 + c_2) \qquad \text{(Eq. 7)}$$

The features obtained solely by the proposed interpolation scheme lack neighborhood and LOD information. In contrast to trilinear interpolation, where the features from the corners of the interpolation cell are shared among neighbors and levels, cylindrical interpolation does not inherently incorporate knowledge between its neighborhood and other LODs. Thus, the usage of a shared across levels 3DCNN for local feature aggregation is proposed, here denoted as $g_{\Theta_l}(\bullet)$. The convolutional kernel $\mathcal{K}_k$ per feature level, where k=0, 1,2 is shared across the tree. For each feature $e_k^l$ at each cell, there is an associated kernel $\mathcal{K}_k$:

$$\overline{e_k^l} = g_{\theta_l}(e_k^l, \mathcal{N}^{\ell}(x), \mathcal{K}_k), \forall l \qquad \text{(Eq. 8)}$$

where $\mathcal{N}(\bullet)$ is the set of neighborhood cells. A 3D sparse convolution is utilized, i.e., the neighbor is ignored if it is not present. The neighborhood comprises neighbor cells within the kernel, with the current cell as the center.

At last, the interpolated features from the geometric encoder in FIG. 6 are the linear interpolation of the coefficients and the local feature computed from the 3DCNN:

$$\overline{f} = \frac{c_0 \overline{e_0} + c_1 \overline{e_1} + c_2 \overline{e_2}}{c_0 + c_1 + c_2} \qquad \text{(Eq. 9)}$$

During implementation, since the method focuses on a new grid-based encoder, the system uses state-of-the-art decoder architecture and output representations to evaluate the method. Loss functions and training procedure are also described below.

For the decoder architecture, multilayer perceptrons are utilized. The decoder is trained at each level and shared across all LODs. Besides the input interpolated feature, a state-of-the-art positional encoder $\phi_p(\bullet)$ is added on the point with $L_p$ frequencies, as well as $\phi_n(\bullet)$ on the anchor's normal with $L_n$ frequencies. The point and the normal are attached to each positional encoder, with the size of $P=3\times2\times L_p+3$ and $N=3\times2\times L_n+3$. The method is shown for SDF and occupancy as output representation.

During the training stage, queries $N_q$ are sampled from the input point cloud, it is determined which voxel they lie in for each of the LODs, and its features are interpolated accordingly to the chosen voxel. The sum of the squared errors of the predicted samples or the cross-entropy are computed from the active LODs for SDF and occupancy, respectively. Additionally, the normals are determined using double backpropagation. Then, the L2-norm is computed between the computed normals and the anchor normals as a regularization term. The two terms are added (weighted sum) to obtain the final loss.

During the evaluation, uniformly distributed input samples are obtained from a unit cube with resolution $Q=512^3$. Results are shown for the last LOD, corresponding to finer LOD. The input query gets discarded if it doesn't match an existing octree cell. Finally, the mesh from the output using marching cubes is obtained.

EXAMPLES

Below are described example implementations and analyses using the methods and systems described or otherwise envisioned herein. It will be understood that these are provided as examples only, and do not limit the scope of the invention.

According to an embodiment, 3D reconstruction quality was evaluated using Chamfer Distance (CD), Normal Consistency (NC), and Intersection over Union (IoU) for each object. The CD was computed as the reciprocal minimum distance for the query point and its ground truth match. CD was computed five times and the mean was shown. NC is the corresponding normals computed from the cosine similarity between the query normal (corresponding to the query point obtained during CD calculation) and its corresponding ground truth normal. The NC is reported as a residual of the cosine similarity between both normals. IoU quantifies the overlap between two grid sets. The meshes were rendered for IoU using a cube of resolution $Q=128^3$.

The method was evaluated on three datasets, namely ABC, Thingi10k, and ShapeNet. A total of 32 meshes were sampled each from Thingi10k and ABC and 150 from ShapeNet. The ShapeNet meshes were watertighted, and the work was implemented in PyTorch.

The decoder architecture has one hidden layer of dimension 128, with ReLU. Each voxel feature is represented as a F=32 dimensional feature vector. The positional encoding for the query point and normal are represented with $L_p=L_n=6$ frequencies. The sparse 3D convolutions are considered for local feature aggregation, with a kernel size Kk, Vl, k=5. The cylinder radius R was empirically set to:

$$R = (h_1 + h_2)/\sqrt{2} \qquad \text{(Eq. 10)}$$

Using the Adam optimizer, the model was trained for up to 100 epochs, with a learning rate of 0.001 and $\alpha_n=0.1$. An initial sample size of $5\times10^6$ points is considered, with a batch size of 512. Resampling is done after every epoch. The points are sampled from the surface and around its vicinity in equal proportions. It is also ensured that each voxel has at least 32 samples before surface sampling. The LODs $\mathcal{L}'=\{3, \ldots, 7\}$ were considered for all the datasets.

For a baseline, the approach was compared against state-of-the-art approaches BACON, SIREN, and Fourier Features (FF), which were trained with the supplied settings. A regular grid direct approach was also evaluated against the method, which required smaller changes in the pipeline, for a fair comparison against the oriented grids. The surface reconstruction setup was the same for all methods, as described above.

For the experiments, ablations were utilized as described below. Regular versus oriented grids were also compared, and the method was evaluated against methods using different encoder strategies. These are discussed below.

Ablations

Figures 7, 8:
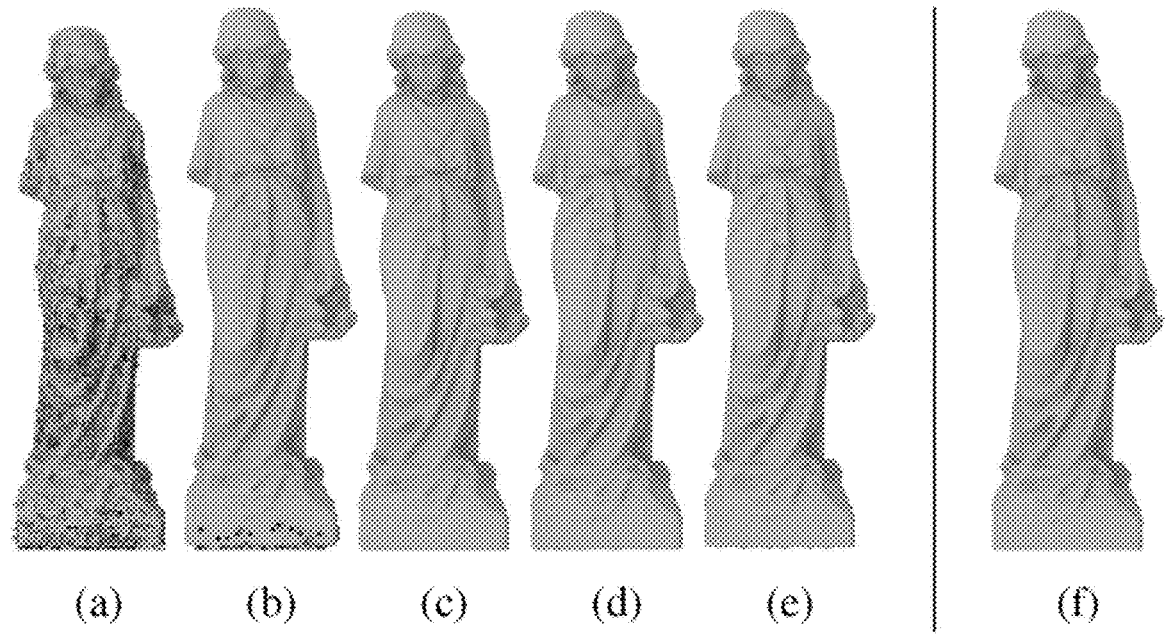
FIG. 7 is a table of the results of ablation studies, in accordance with an embodiment.
FIG. 8 is a schematic representation of the results of the ablation studies, in accordance with an embodiment.

Changes were gradually added to different pipeline blocks to analyze each component's relevance. Ten meshes from ABC and Thingi10k datasets are randomly sampled for training and testing. FIG. 8 shows different cases listed in FIG. 7, based on the changes made to encoder. It was noticed that using oriented grids with trilinear interpolation results in many holes. Since cells are rotated per the anchor normal, a rotation-invariant cylindrical representation was used for interpolation. Though still rougher, this yields a more adapted representation (significant improvement in CD).

Referring to FIG. 7, therefore are the results of the ablation studies. The table shows different stages leading to the final encoder. Starting with oriented grids with trilinear interpolation, proposed cylindrical interpolation, and finally, local feature aggregation with 3DCNNs. The CD is multiplied with $10^{-5}$ and NC by $10^{-4}$.

Referring to FIG. 8 are the ablation effects in rendering, reflecting the numerical results of FIG. 7. Panel (a) represents the oriented encoder with trilinear interpolation; (b) adds cylindrical interpolation; (c) and (d) use 3×3×3 and 5×5×5 3DCNN kernels for feature aggregation, respectively; and (e) adds normal regularization to (d). (f) shows the ground-truth.

There is seen a significant improvement in the mesh smoothness (reflected in NC) with the addition of 3DCNN (FIG. 8 (c) and (d)), effectively contributing to the local feature aggregation step. The experiments show that the kernel of 5×5×5 achieves better performance, preferred for subsequent experiments. The proposed normal regularization enhances smoothness but sacrifices accuracy.

Regular vs. Oriented Grids

Figures 9, 10:
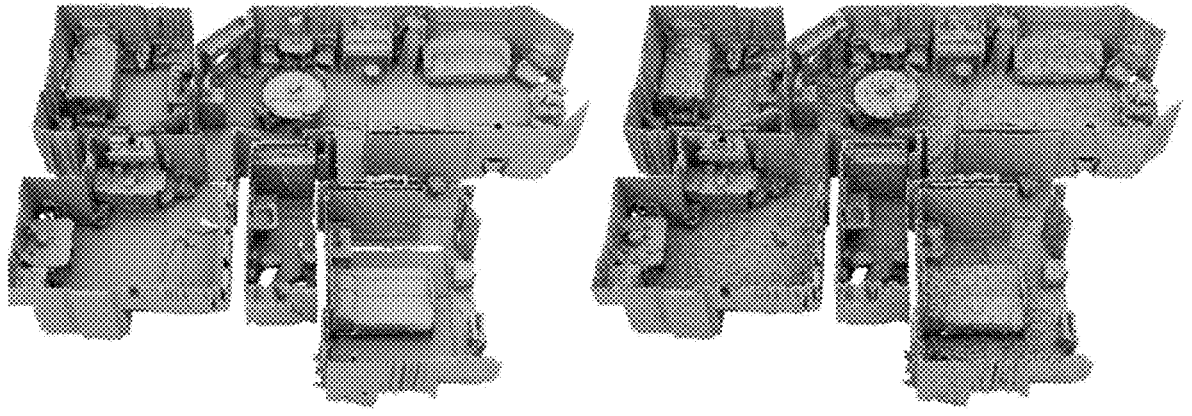
FIG. 9 is a table comparing regular vs. oriented grids, in accordance with an embodiment.
FIG. 10 is a schematic representation of a large-scale scene rendering, in accordance with an embodiment.

Referring to FIG. 9 is a comparison of regular vs. oriented grids, with results for SDF and occupancy decoders. The CD is multiplied with $10^{-5}$ and NC by $10^{-4}$. The table compares the performance of the method disclosed herein with regular grids on SDF and occupancy decoders. SDF and occupancies decoders are trained as explained above. Normal regularization remains the same for both cases. The method disclosed herein outperforms regular grids with an SDF decoder on all fronts, yielding smoother results on structured surfaces. Despite the underperformance of the occupancy framework, fewer holes and dents are observed (with the latter having a significant impact on the IoU) on the mesh. These results show the adaptability of the method to different decoder output representations.

To open possible extensions of the method to large-scale scene representation, a render of the method is shown on a scene from Matterport3D, as shown in FIG. 10. The scene is divided into 4×4 crops (with ground plane included) and a model is trained with an occupancy decoder for each crop. During inference, the mesh crops are rendered using marching cubes and finally fused to yield the scene, as shown in FIG. 10. Due to the thin surfaces, regular grids render a rougher and muddled 3D representation. The method disclosed herein adapts well to thin surfaces and renders the scene with less roughness and sharper quality.

As a consequence of the oriented grids, it is observed that the proposed encoder renders planar surfaces more effectively in fewer training steps. Especially in more structural regular objects, the regular grids produce a caustic-like effect (surface noise). A noise reduction is observed in the surface reconstruction for the oriented grids, as soon as the first epoch.

Baselines

The table in FIG. 11 details the experimental results of the method (feature-based, geometric multi-scale representation) against other types of representations, namely grid-based networks like SIREN and BACON and multiscale representation like BACON. It also compares the method with NDF, which uses an unsigned output representation to account for non-watertight objects. While NDF uses a ball pivoting algorithm to get meshes, it requires a lot of hand-tuning. It was computationally expensive, leading to highly discontinuous mesh representations and poor results. Instead, this step is replaced by voxelizing the point cloud and obtaining the surface using marching cubes, using the same settings from above.

It is shown, therefore, that grid-based methods outperform the baselines with significant improvement on all fronts. In a simple dataset composed of planar objects, like ABC, the encoder reconstructs smoother planar surfaces due to the alignment of the oriented grids. While rendering holistic details, most baselines often have over-smoothed surfaces. A higher IoU is also observed for the method as a consequence of fewer holes in the mesh and negligible splatting (many small mesh traces around the sampling region). Overall the oriented grids produce robust 3D representations across all datasets with higher fidelity.

The number of parameters required for rendering the mesh are also provided. The advantage of multi-resolution grid representations is that the size of the decoder can be reduced to just an MLP with one hidden layer. This results in this approach getting meshes faster than other methods.

Illustrative examples from Thingi10k and ShapeNet datasets were analyzed. While BACON and FF can model the object with reasonable accuracy, it registers a lot of splattering, giving rise to unwanted noisy surfaces and artifacts. SIREN and BACON produce over-smoothed surfaces, losing intricate details on the mesh. NDF produces a lot of holes but manages to get compact meshes without splattering. BACON, SIREN, and FF collapse on the ShapeNet dataset. Both watertight and not watertight versions of ShapeNet were tried, but similar results were obtained for the failing baselines.

Small holes can arise from non-watertight planar surfaces that affect both oriented and regular grids. The oriented grid, however, fills holes more adequately than the regular counterpart. A more general multi-resolution grid representation issue is the difficulty of modeling thin surfaces. Despite the limitation, the method substantially improves from the regular grid.

The examples and experiments therefore demonstrate that this novel approach for a 3D grid-based encoder for 3D representation yields state-of-the-art results while being more robust and accurate to decoder representation change. The encoder considers the inherent structural regularities in objects by aligning the grids with the object surface normal and aggregating the cell features from a newly developed cylindrical interpolation technique and local aggregation scheme that mitigates the issues caused by the alignment.

Additionally, examples and experiments demonstrate that the systems and methods disclosed or otherwise envisioned herein result in an improved computer system. The 3D object representation generation system is capable of generating a better 3D object representation faster than prior art systems. Accordingly, the 3D object representation generation system described herein comprising the trained neural network is an improvement to prior art 3D object representation generation systems.

According to an embodiment, the systems and methods disclosed or otherwise envisioned herein are configured to process many thousands or millions of datapoints during training of the neural network, and during execution using the trained neural network. For example, generating a functional and skilled trained neural network from a corpus of training data requires processing of millions of datapoints from input data and generated features. This can require millions or billions of calculations to generate a novel trained neural network. As a result, each trained neural network is novel and distinct based on the input data and parameters of the algorithm, and thus improves the functioning of the system. Generating a functional and skilled trained neural network comprises a process with a volume of calculation and analysis that a human brain cannot accomplish in a lifetime.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An artificial intelligence (AI) system for producing an implicit representation of a three-dimensional (3D) scene including a 3D object by training a neural network including an encoder configured for encoding data indicative of a 3D point cloud of a shape of the object into grid-based features capturing multiple resolutions of the object and a decoder configured for decoding the grid-based features into a distance to the object from an arbitrary point in the 3D scene, the AI system comprising:

at least one processor and a memory having instructions stored thereon that cause at least one processor of the AI system to:

receive input data indicative of an oriented point cloud of a 3D scene including a 3D object, the input data indicating 3D locations of points of the 3D point cloud and orientations of the points defining a normal to a surface of the 3D object at locations proximate to the 3D locations of the points;

train the encoder and the decoder using both the locations of the points and the orientations of the points to produce an implicit representation of the 3D object, wherein training comprises:

encode, using the encoder, the input data into an octree representation of features capturing multiple resolutions of a shape of the 3D object;

enclose each feature of the octree representation with oriented shapes having rotational symmetry around their axes, wherein dimensions of an oriented shape enclosing a feature are governed by a level of the enclosed feature on the octree representation, and wherein an orientation of an axis of the oriented shape is governed by normals to the surface of a subset of points neighboring coordinates of the enclosed feature;

interpolate features within each oriented shape using a volumetric interpolation to update the features of the octree representation;

decode, using the decoder, the updated octree representation of the features to evaluate a distance to the object; and update parameters of the neural network to minimize a loss function between the evaluated distance and a ground truth distance; and transmit the implicit representation of the 3D object including the encoder and the decoder via a wired or wireless communication channel.

2. The AI system of claim 1, wherein the encoder is trained to transform one or a combination of the locations of points of the 3D point cloud and the orientations of the points into the grid-based features capturing multiple resolutions of the object, and wherein the decoder is trained on interpolations of the grid-based features to reduce a loss function of an error between a distance to the object from a point in the 3D scene produced by the decoder and a ground truth distance.

3. The AI system of claim 2, wherein the encoder is trained to transform the locations of points of the 3D point cloud into the grid-based features, and wherein the decoder is trained on the interpolations within a set of nested shapes enclosing the grid-based features and oriented based on the orientations of the points in proximity of a corresponding nested shape.

4. The AI system of claim 1, wherein the encoder is trained to encode the locations of the points as the grid-based features capturing multiple resolutions of the object, and wherein the decoder is trained based on oriented features represented by interpolations within a set of nested shapes enclosing the grid-based features and oriented based on the orientation of the points in proximity of a corresponding nested shape.

5. The AI system of claim 1, wherein the oriented shapes having rotational symmetry include one or more of a cylinder and a sphere.

6. The AI system of claim 1, wherein each of the oriented shapes having rotational symmetry is a cylinder enclosing one or multiple grid-based features and oriented such that the axis of each of the cylinders is aligned to a normal to a region of a surface governed by dimensions of the cylinder and locations of the enclosed features.

7. The AI system of claim 6, wherein each of the oriented shapes having rotational symmetry is a cylinder enclosing one or multiple grid-based features, and wherein the processor is configured to orient the cylinder to align the axis of the cylinder to a normal to a region of a surface governed by dimensions of the cylinder and locations of the enclosed features.

8. The AI system of claim 6, wherein the interpolation is a volumetric interpolation, and wherein the processor is configured to determine cylindrical interpolation coefficients measuring closeness of a point to extremities of the cylindrical representation.

9. The AI system of claim 8, wherein the cylindrical interpolation coefficients comprise: (i) a first coefficient computed from a distance of the point to a top plane of the cylinder and a difference in volume of the cylinder and the point's distance to an axis of symmetry of the cylinder; (ii) a second coefficient computed from a distance of the point to a bottom plane of the cylinder and the difference in volume of the cylinder and the point's distance to the axis of symmetry of the cylinder; and (iii) a third coefficient computed from a remainder of the cylinder.

10. The system of claim 9, wherein during training of the encoder of the neural network, the processor is configured to determine the cylindrical interpolation coefficients for a plurality of sampled points of an input point cloud.

11. The AI system of claim 1, wherein the processor is configured to render an image of the 3D object on a display device using the implicit representation of the 3D object.

12. An image processing system operatively connected to the AI system of claim 1 via the wired or wireless communication channel, wherein the image processing system is configured to render an image of the 3D object on a display device using the implicit representation of the 3D object.

13. The image processing system of claim 12, wherein the image of the 3D object is rendered for varying viewing angles.

14. The image processing system of claim 13, wherein the image of the 3D object is rendered for varying viewing angles within a virtual reality or gaming application.

15. A robotic system operatively connected to the AI system of claim 1 via the wired or wireless communication channel, wherein the robotic system is configured to perform a task using the implicit representation of the 3D object.

16. A display device operatively connected to the AI system of claim 1 via the wired or wireless communication channel, wherein the processor is configured to render an image of the 3D object using the implicit representation of the 3D object, and wherein the display device is configured to display the rendered image of the 3D object.

17. An image processing system configured to render an image of a three-dimensional (3D) object on a display using an implicit representation of the 3D object, wherein the image processing system comprises:

a trained neural network including an encoder configured for encoding data indicative of a 3D point cloud of a shape of the 3D object into grid-based features capturing multiple resolutions of the object and a decoder configured for decoding the grid-based features into a distance to the object from an arbitrary point in a 3D scene including the 3D object;

at least one processor and a memory having instructions stored thereon that cause the at least one processor to:

receive input data indicative of an oriented point cloud of a 3D scene including a 3D object, the input data indicating 3D locations of points of the 3D point cloud and orientations of the points defining a normal to a surface of the 3D object at locations proximate to the 3D locations of the points;

produce, with the encoder using both the locations of the points and the orientations of the points, an implicit representation of the 3D object;

render, with the encoder an image of the 3D object using the implicit representation of the 3D object; and display the rendered image on a display; wherein the encoder and the decoder were trained by operations comprising:

encoding, using the encoder, input data into an octree representation of features capturing multiple resolutions of a shape of the 3D object;

enclosing each feature of the octree representation with oriented shapes having rotational symmetry around their axes, wherein dimensions of an oriented shape enclosing a feature are governed by a level of the enclosed feature on the octree representation, and wherein an orientation of an axis of the oriented shape is governed by surface normals of a subset of points neighboring coordinates of the enclosed feature;

interpolating features within each oriented shape using a volumetric interpolation to update the features of the octree representation;

decoding, using the decoder, the updated octree representation of the features to evaluate, for a 3D query coordinate, a distance to the object; and updating parameters of the neural network to minimize a loss function between the evaluated distance and a ground truth distance.

18. The image processing system of claim 17, wherein the encoder is trained to transform the locations of points of the 3D point cloud into the grid-based features, and wherein the decoder is trained on the interpolations within a set of nested shapes enclosing the grid-based features and oriented based on the orientations of the points in proximity of a corresponding nested shape.

19. The image processing system of claim 17, wherein the image of the 3D object is rendered for varying viewing angles.

* * * * *